Oct. 8, 1957 W. SCHMID ET AL 2,808,620
MACHINES FOR MOLDING PLASTIC ARTICLES
Filed Dec. 31, 1953
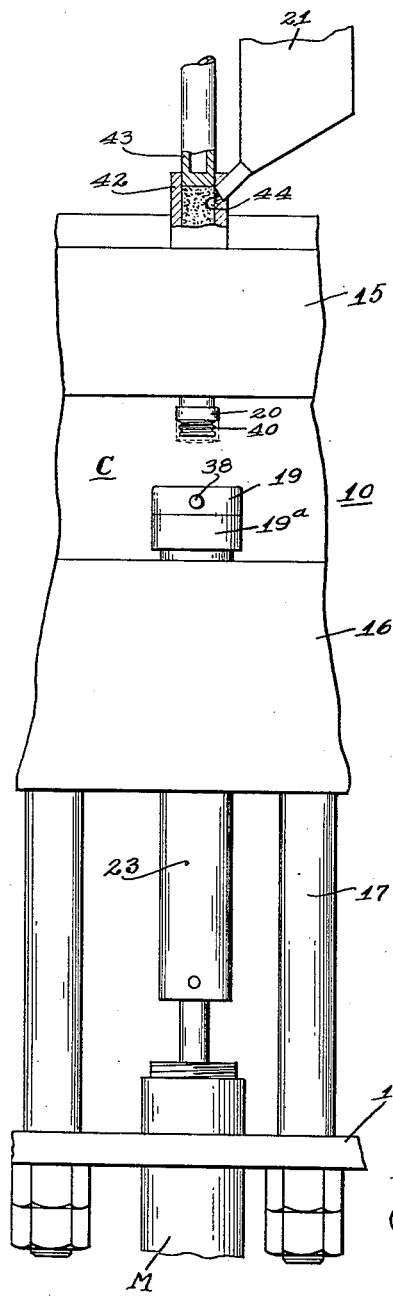
Fig.1.
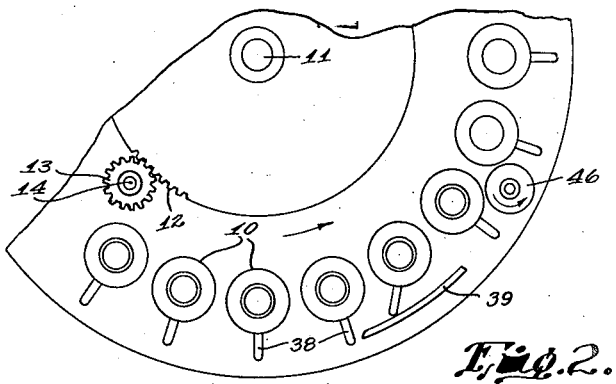
Fig.2.
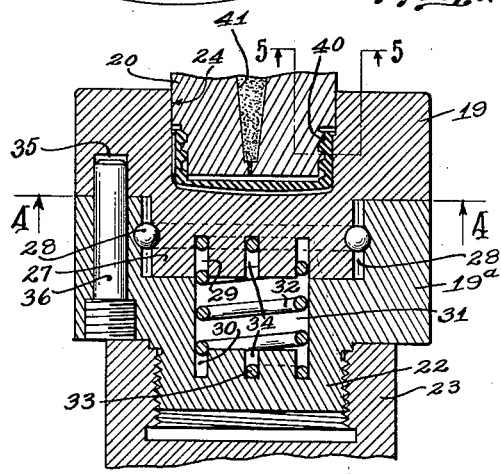
Fig.3.
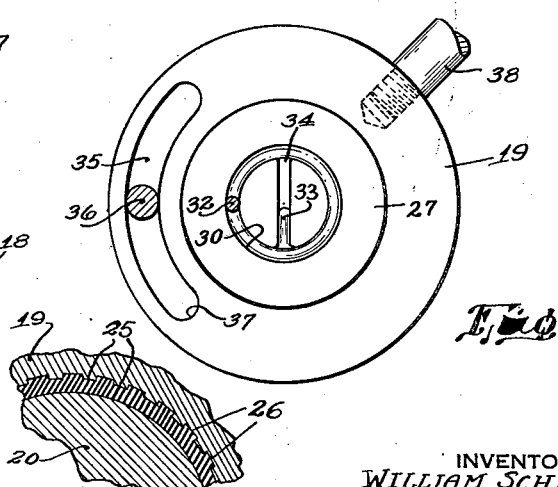
Fig.4.
Fig.5.
INVENTORS
WILLIAM SCHMID
JOHN E. POOLE
BY Rule & Hoge
ATTORNEYS United States Patent Office 2,808,620
Patented Oct. 8, 1957

2,808,620

MACHINES FOR MOLDING PLASTIC ARTICLES

William Schmid and John E. Poole, Toledo, Ohio, assignors to Owens-Illinois Glass Company, a corporation of Ohio Application December 31, 1953, Serial No. 401,477

3 Claims. (Cl. 18—20)

The present invention relates to improvements in machines for molding plastic articles and more particularly is a novel means for effecting removal of finished articles from the molding means.

In the production of plastic articles such as bottle and jar closures and the like pieces, the molding material may be deposited in a mold in powder form and converted by heat and pressure to a solid state and finally shaped. Alternatively the material may be a thermoplastic material which is plasticized and then injected into the mold cavity by way of an opening through a nozzle which may well be a part of the force plug comprising an element of the molding means.

It is common practice in either event to remove the finished article from the machine by stripping it from the cavity mold leaving the article attached to the force plug and thereafter removing such article from the plug. Where the article is an internally screw-threaded bottle closure or the like, it is unscrewed from the plug by means of a rotary wheel, or disk, such step being preceded by an operation which initially breaks or loosens the article from the plug.

This initial loosening is essential for the reason that the article during setting of the plastic material shrinks slightly and so tightly grips the plug that it may not be removed merely by bringing its peripheral skirt or flange portion into engagement with the rotary disk. One means for accomplishing such initial loosening is the gripping device shown in Lauterbach Patent 2,155,316 dated April 18, 1939.

An object of our invention is the provision of means for effecting such initial loosening of the article on the plug during stripping of the article from the cavity mold.

Another object is the provision of novel means for effecting rotation of the article upon the force plug coincident with relative axial movement of the plug and cavity mold.

A further object is the provision of novel means for positively rotating the cavity mold about its axis a predetermined distance relative to the plug, while holding the mold and article against relative rotation during at least a part of the relative axial movement of the plug and cavity mold, so that the article rotates upon and is thereby loosened on the plug while being stripped from the cavity mold.

It is also an object of our invention to provide spring means whereby, following each loosening operation, the cavity mold is returned to its original position automatically.

Other objects will be in part apparent and in part pointed out hereinafter.

In the drawings:

Fig. 1 is a fragmentary front elevational view, partly in section, of one mold unit, or head, incorporating our invention;

Fig. 2 is a fragmentary schematic plan view showing a plurality of molding units;

Fig. 3 is a vertical sectional view of the mold showing the molded closure immediately following initial downward movement of the cavity mold and loosening of the closure on the force plug;

Fig. 4 is a transverse sectional plan view taken substantially along the line 4—4 of Fig. 3; and Fig. 5 is a fragmentary detail sectional view taken along the line 5—5 of Fig. 3 showing the means for holding the article and cavity mold against relative rotation while permitting stripping of the article from said mold.

In the illustrated embodiment of our invention it is shown as incorporated in an injection type of molding machine, although it is equally adaptable to machines in which the molding material in powder form is deposited in the cavity mold and subjected to heat and pressure, such being known as "thermosetting" and illustrated for example in the Lauterbach patent heretofore identified.

Briefly, the machine comprises a plurality of molding units or heads 10 mounted for rotation about a vertical axis 11, such rotation being continuous and effected by means of a ring gear 12 which is driven by a pinion gear 13 on a driven shaft 14. These molding units or heads, are mounted upon a carriage C or frame, including interconnected upper and lower members 15 and 16 respectively, the latter being connected by tie-rods 17 to a base member 18. A cavity mold 19 is mounted upon the lower member 16 and a force plug 20 and molding material feeder 21 are carried by the upper member 15. The cavity mold is movable vertically into and out of cooperative relationship with the force plug 20. Incident to movement of the cavity mold away from the force plug following a molding operation, it rotates about its axis a few degrees to loosen the article on the force plug, such occurring simultaneously with stripping of the article from the cavity mold. Longitudinal ribs on the exterior surface of the article secure the latter against rotation relative to the cavity mold whereby to insure the desired loosening of said article on the force plug.

The cavity mold 19 is rotatably mounted in a holder 19ᵃ which is separably connected by means of a screw-threaded shank 22 to a carrier 23. This carrier 23 is connected to a piston motor M which may be hydraulically operated to move the mold vertically. Specifically the mold comprises a disk-like block formed with a central upwardly facing cavity 24 of the preferred configuration to define the exterior contour of the article to be molded therein. As shown in Fig. 5 the side wall of this cavity is formed to include an annular series of circumferentially spaced ribs 25 which extend lengthwise or vertically of the cavity. These ribs and the intervening grooves 26 mold alternate grooves and ribs on the article, which is a bottle closure, in the instant disclosure. Such arrangement holds the article and mold against relative rotation, while permitting stripping of the article axially from the cavity, as will be pointed out hereinafter. Obviously any non-circular skirt or flange contour will accomplish the same results. Likewise an upward projection on the bottom of the mold could perform the same function.

Depending from the central portion of this cavity mold block is an extension 27 which projects into a recess 28 in the upper side of the holder 19ᵃ, said recess being of somewhat larger diameter than the recess. This extension 27 and the wall of said recess are formed with opposed cooperating annular raceways which accommodate a plurality of anti-friction balls 28, whereby the cavity mold block is floatingly supported in the holder 19ᵃ and free to rotate thereon.

It is necessary that the cavity mold motion be controlled and limited, in consequence of which the following structure is utilized. The lower side of the extension 27 of the cavity mold block is formed with an annular channel or groove 29 facing downwardly and registering with a corresponding annular groove 30 in the bottom of a corresponding recess 31 provided in the holder 19ª. These annular grooves accommodate a coil spring 32, the opposite ends 33 of which, are held in transverse channels 34. Thus, when the cavity mold block is rotated in one direction relative to the holder 19ª, the spring is placed under tension. Release of the cavity mold block permits the spring to reverse the direction of rotation of the former and return same to its normal operating position.

An arcuate channel 35 in the lower side of the cavity mold block, together with a pin 36 carried by the holder 19ª and projecting into said channel, limits the degree of possible relative rotation of the holder and cavity mold block. The end wall 37 of this arcuate channel 35 forms a stop which determines accurately the normal position of the cavity mold block in relation to the holder. A radial finger 38 (Figs. 2 and 4) on the cavity mold block is intended to be brought into contact with a fixed actuator bar 39 at the proper time to impart a few degrees of rotary motion of the cavity mold in relation to the force plug 20 to loosen the cap on the latter.

The force plug 20 may be formed with screw threads 40 which mold threads on the interior of the closure. This plug seals the entrance end of the mold cavity and by reason of the axial conduit 41 therethrough functions as a nozzle through which plasticized molding material may be delivered from the cylinder 42 to said mold cavity. A plunger 43 functions to force the material through said cylinder and to periodically close the feed opening 44 near the upper end of the cylinder. The hopper 21 or reservoir for the molding material, which may be polyethylene or the like, is connected to the feed opening 44.

Incident to rotation of the mold units the cavity mold moves upwardly to enclose the force plug. The plunger 43 then forces a quantity of the plastic material into the cavity about the threaded end of the plug. Immediately upon setting of this material, the cavity mold 19 begins to move downwardly away from the force plug, leaving the closure or other article, attached to the force plug. Owing to the presence of the longitudinal ribs on the skirt of the closure, it is apparent that the closure cannot rotate in the cavity, but is free to move axially out of the latter. This is the stripping operation. Substantially at the moment the mold begins its downward movement, or in any event before it has been completely disengaged from the closure, the finger 38 on the cavity mold block strikes the actuator bar 39. Immediately the cavity mold is rotated a few degrees to loosen the closure on the force plug. During these operations the molding units continue to rotate about the vertical axis 11 of the machine. Downward travel of the cavity mold continues, leaving the closure loosely supported on the force plug. Continued advancing movement of the mold unit brings the loosened closure into contact with a rotating unscrewing disk 46 which completely removes the closure from the force plug. The closure may fall by gravity into or upon any suitable receiver (not shown).

Modifications may be resorted to within the spirit and scope of the appended claims.

We claim:

1. In combination, a plurality of molding units movable about a vertical axis, means for moving the units continuously, each unit comprising a force plug having its axis disposed vertically, a cavity mold axially aligned with said force plug and formed so as to be non-rotatable relative to an article being molded therein, means for moving the cavity mold vertically to and from a position to enclose the force plug, a mold holder connected to the last-named means, means whereby the cavity mold is free to rotate about its axis relative to said holder, spring means yieldingly holding the cavity mold against rotation, pin and stop means for determining the limits of rotary motion of the cavity mold, a radial finger on each cavity mold and a stationary bar positioned to engage the finger and thereby rotate the mold through a predetermined angle and then release same for reverse rotation under influence of the spring means.

2. In combination, a series of molding units movable in a closed horizontal path, each unit including a vertically disposed force plug, a cavity mold mounted for axial vertical movement and for rotation about its own axis, means for moving the mold upwardly toward and downwardly away from the force plug thereby to enclose the force plug in the mold at times, means for imparting rotary motion to the cavity mold coincident with at least a part of the initial downward movement of the latter away from the plug, and means forming a part of the mold cavity wall for holding an article being molded in said cavity, against rotation relative to the mold, the cavity mold mounting including an axial downward extension, a holder having a recess to receive said extension, spring means within the recess yieldingly holding the mold and holder against relative rotation, and means for limiting the degree of possible relative rotation between the cavity mold and said holder.

3. In combination, a series of molding units movable in a closed horizontal path, each unit including a vertically disposed force plug, a cavity mold mounted for axial vertical movement and for rotation about its own axis, means for moving the mold upwardly toward and downwardly away from the force plug thereby to enclose the force plug in the mold at times, means for imparting rotary motion to the cavity mold coincident with at least a part of the initial downward movement of the latter away from the plug, and means forming a part of the mold cavity wall for holding an article being molded in said cavity, against rotation relative to the mold, the cavity mold mounting including an axial downward extension, a holder having a recess to receive said extension, spring means within the recess yieldingly holding the mold and holder against relative rotation, cooperating pin and slot means in the cavity mold and holder for limiting the degree of possible relative rotation between the cavity mold and said holder.

References Cited in the file of this patent

UNITED STATES PATENTS

| | | |
|---|---|---|
| 2,440,367 | Cropp | Apr. 27, 1948 |
| 2,513,216 | Sullivan et al. | June 27, 1950 |

FOREIGN PATENTS

| | | |
|---|---|---|
| 669,819 | Great Britain | Apr. 9, 1952 |